(No Model.)
F. J. HERRICK & A. McMANUS.
MOVABLE HOOK AND PLATE.
No. 309,621. Patented Dec. 23, 1884.
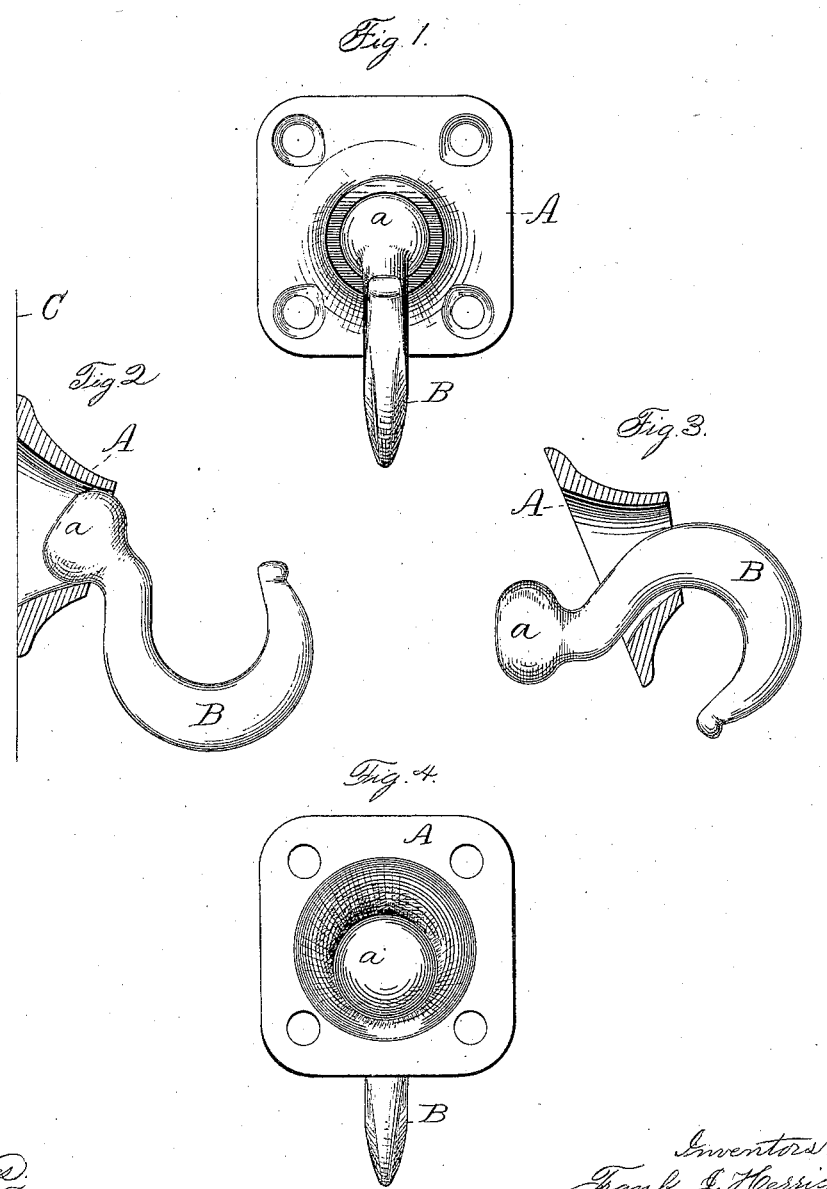

UNITED STATES PATENT OFFICE.

FRANK J. HERRICK AND ALONZO McMANUS, OF NEW BRITAIN, CONNECTICUT, ASSIGNORS TO THE NORTH & JUDD MANUFACTURING COMPANY, OF SAME PLACE.

MOVABLE HOOK AND PLATE.

SPECIFICATION forming part of Letters Patent No. 309,621, dated December 23, 1884.

Application filed October 16, 1884. (No model.)

*To all whom it may concern:*

Be it known that we, FRANK J. HERRICK and ALONZO McMANUS, citizens of the United States, residing at New Britain, in the county of Hartford and State of Connecticut, have invented certain new and useful Improvements in Movable Hooks and Plates, of which the following is a specification.

Our invention relates to hooks of the class which are removably secured to a plate and designed for use as hammock-hooks, clothes-line hooks, &c.

In the accompanying drawings, Figure 1 is a front elevation of our hook. Fig. 2 is a vertical section of the plate, with a side elevation of the hook. Fig. 3 is a like view showing the manner of assembling the parts, and Fig. 4 is a rear elevation of our hook.

A designates the base-plate, which consists of a projecting socket with surrounding base, in which are holes to receive fastening-screws. The front edge of the socket is slanting, so that it projects the farthest at its upper part.

B designates the hook, the body of which is of ordinary form, while its shank end is in the form of a ball-shaped head, $a$. This head is small enough to play freely within the socket, and at the same time large enough so that it cannot be pulled through said socket. The hook immediately under the head is also small enough so that it may have a degree of lateral movement. After the castings are obtained, the hook is connected with the socket by passing its small end through the opening therein, as shown in Fig. 3, and then drawing the head $a$ into the socket, as shown in the other figures. The socket must be so shaped with reference to the hook that its curved body can readily pass through the socket, as shown in Fig. 3. When the base is secured in place to a wall or post the face of which is designated by the line C, Fig. 2, the hook cannot be removed from the socket. By making the front edge of the socket slanting and projecting most at the top, the hook is free to fall down into a pendent position, as shown in Fig. 1. The ball-and-socket connection forms a universal joint, so that the hook is free to swivel or move sidewise in any direction, thereby not only forming a cheap hook and plate, but one which has a greater freedom of movement than in a hook and plate having an eye-and-staple or eye-and-eye connection.

We are aware that a hitching-bar for tying horses has been connected to its securing-plate by means of a ball-and-socket joint, and we hereby disclaim the same.

We claim as our invention—

1. The combination of the plate A, having the projecting socket, and the hook B, having a curved body and a ball-shaped head formed directly thereon, all substantially as described, and for the purpose specified.

2. The combination of the plate A, having a socket with a slanting front edge, and the hook B, having the ball-shaped head $a$, and fitted to said socket, substantially as described, and for the purpose specified.

FRANK J. HERRICK.
ALONZO McMANUS.

Witnesses:
H. C. NOBLE,
E. M. WIGHTMAN.